Mar. 27, 1923.
J. P. SEAHOLM
PLOW
Filed Aug. 16, 1919
1,449,556
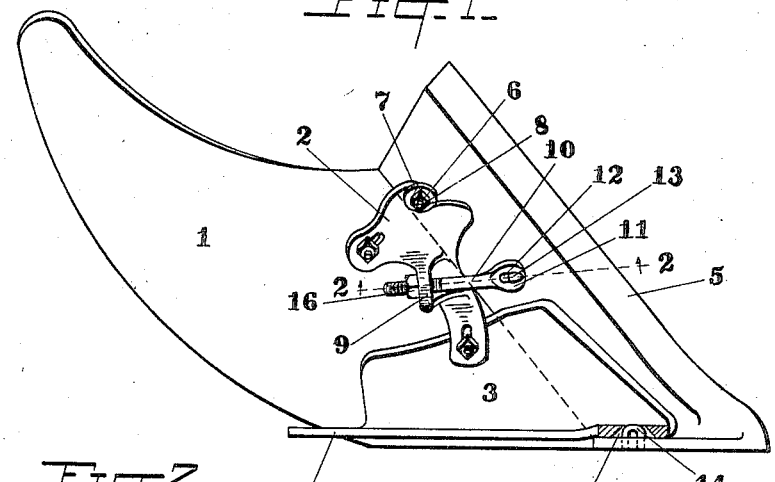
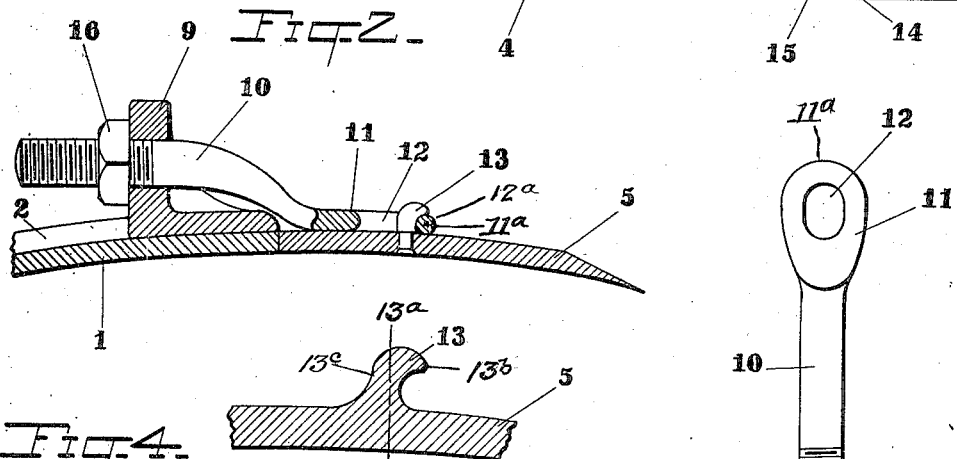
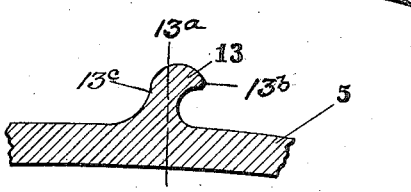
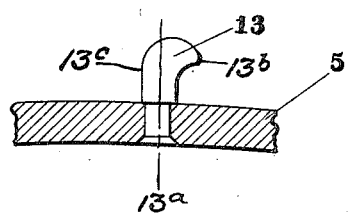
Witness:
Erich G. Erickson
Inventor:
John P. Seaholm
by W. C. Johnston
Attorney Patented Mar. 27, 1923.

1,449,556

UNITED STATES PATENT OFFICE.

JOHN P. SEAHOLM, OF MOLINE, ILLINOIS, ASSIGNOR TO DEERE & COMPANY, OF MOLINE, ILLINOIS, A CORPORATION OF ILLINOIS.

PLOW.

Application filed August 16, 1919. Serial No. 317,928.

*To all whom it may concern:*

Be it known that I, JOHN P. SEAHOLM, a citizen of the United States, residing at Moline, in the county of Rock Island and State of Illinois, have invented certain new and useful Improvements in Plows, of which the following is a specification, reference being had therein to the accompanying drawing.

My invention relates to plows and more particularly to that type having a quick detachable share, and the object of my invention is to provide a plow body in which the various parts are readily and quickly assembled or taken apart.

Referring to the drawings in which similar numerals indicate identical parts—

Figure 1 is a bottom view of the plow body assembled.

Figure 2 is a detail section on the line 2—2 of Figure 1.

Figure 3 is an enlarged cross section of part of the share and attached lug.

Figure 4 is a similar view showing the lug integral with the share, and

Figure 5 is a representation of the bolt by which the share is drawn into position and secured.

As shown in Figure 1 the plow is assembled ready to be attached to a beam, and comprises a moldboard 1 having bolted rigidly thereon a brace 2 having its lower end securely bolted to a frog 3 the same bolt securing the frog 3 and moldboard together. The frog 3 has a portion 4 to which the landside is to be secured. The share 5 carries a bolt 6 at its heel end adjacent its contact with the moldboard 1, the bolt 6 being adapted to engage with a notch 7 in the brace 2 and is held securely in place by a nut 8 and a washer interposed between the nut 8 and the notch 7.

A lug 9 is preferably integral with the brace 2 and has a suitable aperture for passage of a bolt 10 which extends toward the share 5 and has a flattened head 11 provided with a slot 12 of equal width throughout its length. The slot 12 is engageable with a lug 13 having a stem $13^c$ riveted on the share 5, as shown in Figure 2 or formed integral with the share 5, as shown in Figure 3. The lug 13 is bent to form a hook $13^b$ extending radially from the axis $13^a$ of stem $13^c$ toward the cutting edge of the share 5 and in line with the bolt 10. The landside end of the share is provided with a lug 14 which engages with a slot 15 in the frog 3 as the parts are assembled. In assembling the plow the moldboard 1, frog 3 and brace 2 are first secured together, the bolt 10 having been passed through the opening in the lug 9 and retained therein by a nut 16; the opening being sufficiently large to allow the bolt 10 to move freely therein. The share 5 is now placed so that the lug 14 enters the slot 15 in the frog 3 and the bolt 6 engages with the notch 7 in the brace 2. By turning the nut 16 a sufficient number of times the bolt 10 is projected toward the share 5 until the slot 12 is over the lug 13, the head of the bolt 10 is then pressed down toward the share 5 until the lug 13 has passed through the slot 12, then by turning the nut in a reverse direction the bolt is drawn toward the lug 9 so that it engages with the stem $13^c$ of the hooked lug 13 drawing the share 5 in close contact with the moldboard 1 and the frog 3, a continued turning of the nut 16 holding the parts rigidly together with the hooked end of the lug 13 projecting over and engaging with the outer or lower surface of the metal at the extreme end of the bolt 10 and holding the bolt and lug in rigid engagement. The lug hook $13^b$ is narrower than the slot and at its inner end is of the same width as the stem $13^c$; and when in working position neither the stem nor the hook of the lug have contact with the outer surface of the metal of the bolt at the sides of the stem. It is obvious that again reversing the turn of the nut 16 the bolt 10 can be readily freed from the lug 13 and the share 5 quickly removed.

As the result of the various heatings and coolings of the several parts of the plow body, and of the press actions, and other work in manufacture, conformations and shapings, of the edges and surfaces of said parts, which are required for a perfect body, cannot be obtained. And because of the unavoidable distortions and malforming of the parts, it is necessary when assembling them to apply considerable force. The share is not only moved, bodily, backward, upward and laterally, relatively to the other parts, but it frequently requires rocking to bring it into the proper relative position and there is more or less flexing of the different parts of its metal, for example, when the lug and the cam at its inner end force it against the frog.

The bolt 10 is the single stress-exerting device to effect all these necessary movements of the share. The force should be exerted, as nearly as possible, at one point only, and there should be a self-adjustability of the parts under stress, particularly the share.

This is attained in the present construction. The longitudinal axis 13ª of rigid hook lug 13 and the axis at 12ª of the part 11ª of the bolt-loop, are at right angles to each other and provide, practically, a universal coupling. The lug has no part contacting with the lower surface of the bolt-loop except at one line at the end, the loop at the sides of the lug being free from pressure or contact. The hook proper at 13ᵇ is narrower than the loop and projects radially from axis 13ª in one direction only, namely, that opposite to the one in which draft is exerted.

The share adapts itself to various conditions as it comes to place; can rock slightly at any time, in either direction, even when under stress.

And these relations of the hook with the metal are very important in respect to permitting self-adjustment of the parts under strain, and allowing freedom for their reaching the predetermined limits of their movements; at the same time the share is held properly in position, though permitting quick detachment at any time.

The metal at the base of the stem part of the lug is enlarged laterally to provide a wide abutment for resisting the draft exerted on the lug by the bolt. It may be provided either by using a relatively large stem and forming upon it an expanded shoulder to lie against the surface of the share, or by casting as shown in Fig. 4. It extends not only laterally from the axis of the stem, but backward in the direction opposite to that in which extends the forwardly turned hook part. It acts to prevent the draft from bending the stem of the lug, or breaking it loose from the share, or tearing the riveted part from the aperture in the share.

The head 11 of the bolt is elongated and flattened and provides an extended bearing or seat for the share when the latter is forced by the draft to its final position.

What I claim is—

1. The combination with the plow body having a frog, a moldboard, and a detachable share, of means for locking the share to the frog and to the moldboard comprising a bolt having an elongated end portion bearing throughout against the surface of the share and formed with a slot, and a lug on the share having a stem and a hook-like projection, the stem being adapted to be passed through said slot and to engage with the metal at the end thereof and having a shouldered portion or enlargement which bears against the share surface and extends backward from the axis of the stem, and said hook-like projection being narrower than the slot and extending from the stem in one direction only, to wit, in the direction opposite to that in which said enlargement extends.

2. The combination with a plow body having a frog, a moldboard and a detachable share, of means for locking the share to the frog and the moldboard comprising a bolt having an elongated head bearing throughout against the surface of the share and formed with a slot, and a lug on the share having a cylindrical stem adapted to pass through the slot and a hook-like projection, said projection extending from the stem in one direction only, to wit, forward relatively to the draft of the bolt, and the stem having a shouldered portion or enlargement bearing against the share surface and extending backward from the axis of the stem relatively to said projection.

JOHN P. SEAHOLM.